US005189905A

United States Patent [19]

Waldrop

[11] Patent Number: 5,189,905
[45] Date of Patent: Mar. 2, 1993

[54] INTEGRAL GAS COMPRESSOR AND INTERNAL COMBUSTION ENGINE

[75] Inventor: James L. Waldrop, Woodward, Okla.
[73] Assignee: Gas Jack, Inc., Oklahoma City, Okla.

[21] Appl. No.: 725,637
[22] Filed: Jul. 3, 1991

Related U.S. Application Data

[62] Division of Ser. No. 541,777, Jun. 21, 1990, which is a division of Ser. No. 427,576, Oct. 27, 1989, Pat. No. 4,961,691.

[51] Int. Cl.[5] ............ G01M 15/00
[52] U.S. Cl. ............ 73/54.09; 73/116
[58] Field of Search ............ 123/196 S, 198 DC; 73/64, 56, 116, 54.09

[56] References Cited

U.S. PATENT DOCUMENTS

| | | | |
|---|---|---|---|
| 2,051,026 | 8/1936 | Booth | 73/56 X |
| 2,133,769 | 10/1938 | Jones | 230/56 |
| 2,371,345 | 3/1945 | Monroe et al. | 230/17 |
| 2,831,625 | 4/1958 | Hartwell et al. | 230/24 |
| 2,896,656 | 7/1959 | Allen et al. | 137/92 |
| 3,292,848 | 12/1966 | Kehler | 230/231 |
| 3,366,100 | 1/1968 | Sapp | 123/198 DC |
| 3,373,695 | 3/1968 | Yohpe | 103/153 |
| 3,462,074 | 8/1969 | Grimmer | 230/181 |
| 3,548,638 | 12/1970 | Uchida et al. | 73/55 |
| 3,805,827 | 4/1974 | Kennedy et al. | 137/516.17 |
| 3,986,798 | 10/1976 | Lindell et al. | 417/564 |
| 4,115,044 | 9/1978 | Gannaway | 417/564 |
| 4,140,442 | 2/1979 | Mulvey | 417/454 |
| 4,255,090 | 3/1981 | Pratt | 417/53 |
| 4,308,001 | 12/1981 | Hofbauer et al. | 417/364 |
| 4,391,568 | 7/1983 | Tenney | 417/237 |
| 4,404,812 | 9/1983 | Zinsmeyer | 62/84 |
| 4,429,532 | 2/1984 | Jakuba | 60/600 |
| 4,630,360 | 12/1986 | Ochsner et al. | 29/622 |
| 4,642,037 | 2/1987 | Fritchman | 417/571 |
| 4,653,986 | 3/1987 | Ashton | 417/243 |
| 4,672,231 | 6/1987 | Sutton et al. | 307/118 |
| 4,700,663 | 10/1987 | Dunn | 123/1 R |
| 4,723,442 | 2/1988 | Manning et al. | 73/55 |
| 4,801,250 | 1/1989 | Lammers | 417/265 |
| 4,932,242 | 6/1990 | Kawashima et al. | 73/55 |

FOREIGN PATENT DOCUMENTS

| | | | |
|---|---|---|---|
| 796850 | 4/1936 | France | 73/56 |

OTHER PUBLICATIONS

Instruction Manual and Parts List-Model 100, copyright 1971, by Gordon Smith & Co., Inc.
Instruction Manual and Parts List-Model 125, copyright 1971, by Gordon Smith & Co., Inc.
The Smith Model 100 is the Proven Gas Air Compressor in the Rental Industry Assuring Maximum Performance . . . Minimum Downtime. sales brochure.
The Smith Model 160 with its High Efficiency Performance . . . More Air, Less Fuel . . . is the #1 Selling Two Tool Gas Air Compressor. sales brochure.

*Primary Examiner*—Jerry W. Myracle
*Attorney, Agent, or Firm*—Laney, Dougherty, Hessin & Beavers

[57] ABSTRACT

An integral gas compressor and internal combustion engine. The compressor is built by converting a portion of an internal combustion engine to a compressor by removing the original engine head and valve train and replacing these with a compressor head assembly. The compressor head assembly includes compressor valves and valve chairs for holding the compressor valves in place. An inlet manifold encloses all of the valve chairs and places all of the inlet flow paths through the valve chairs in communication with a gas source. The head defines a discharge passageway therethrough which is in communication with a discharge opening. A venting system is provided to vent any gas that might build up in the compressor due to leakage past the piston rings and to transfer this vented gas to a fuel inlet of the engine, as desired. An oil viscosity sensing system is provided for sensing the oil viscosity in the crankcase and shutting down the engine when the viscosity drops below a predetermined level.

4 Claims, 5 Drawing Sheets

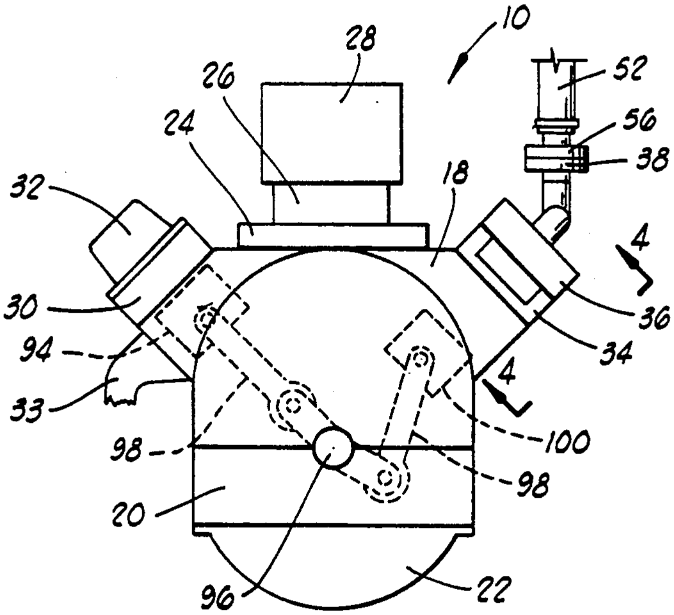
FIG. 3
FIG. 4A
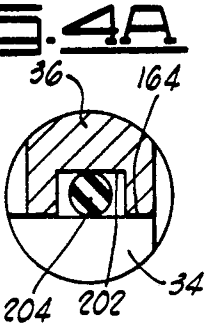
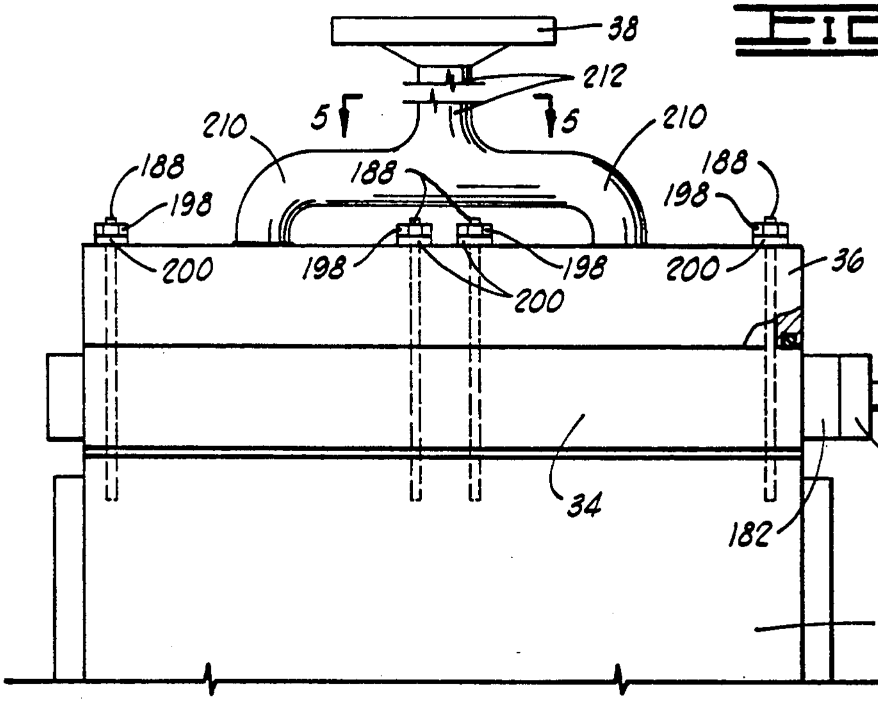
FIG. 4

INTEGRAL GAS COMPRESSOR AND INTERNAL COMBUSTION ENGINE

This is a divisional of copending application Ser. No. 07/541,777 filed on Jun. 21, 1990, which was a division of Ser. No. 07/427,576 filed on Oct. 27, 1989, now U.S. Pat. No. 4,961,691.

BACKGROUND OF THE INVENTION

1. Field Of The Invention

This invention relates to gas compressors and more particularly, to an integral gas compressor and internal combustion engine adapted for use on flammable gases such as natural gas.

2. Description Of The Prior Art

Reciprocating gas compressors are well known in the art, and generally such compressors are powered by a separate prime mover such as an electric motor or gas powered internal combustion engine. Electric motors have a disadvantage in flammable gas applications in that they often must be of a type which is at least partially explosive proof. These types of motors are relatively expensive. A disadvantage of using an electric motor of a separate internal combustion engine for driving compressors is that the drive train must include a power transmission means such as a coupling, V-belt drive, gear drive or chain drive. The present invention solves these problems by providing a gas compressor which is integral with the internal combustion engine which drives it. Preferably, the unit is constructed by modifying a portion of the cylinders in the internal combustion engine into a gas compression section.

Conversion of portions of engines into air compressors is known in the art. For example, U.S. Pat. No. 2,133,769 to Jones discloses an engine-compressor unit with one side of a V-shaped engine being converted to an air compressor. The engine discloses a Ford V-8, but other engine makes may be used. A compressor head is installed on one bank of cylinders of the engine in place of the engine head, and intake and exhaust valves are installed in the compressor head. In this apparatus, air is drawn directly into the individual inlet valves, and there is no manifolding of the inlet. The Jones apparatus is designed for use with atmospheric air only, and does not address the problems involved with handling gases with inlet pressures above atmospheric pressure or gases which are flammable, such as natural gas. The present invention provides a integral compressor and engine specifically adapted for flammable gases including manifolding all of the valve inlets together, monitoring the oil viscosity in the crankcase to insure that the gas has not diluted the oil, and venting the crankcase so that flammable gases will not build up therein.

It is well known in the art that air compressors designed for atmospheric air are not well adapted for use with incoming gases above atmospheric pressure, and particularly are not well adapted, and may even be unsafe, for use with flammable gases. Thus, the prior art air compressor engine conversions are totally unsuitable for applications other than atmospheric air.

SUMMARY OF THE INVENTION

The present invention includes an internal combustion engine which has a portion thereof converted to a gas compressor and a method of use thereof. The invention is particularly well adapted for use with flammable gases, such as natural gas. A method of the invention for transferring natural gas comprises the steps of removing an engine head and associated engine valve and other components from a cylinder block of an internal combustion engine, installing a compressor head assembly on the cylinder block, supplying natural gas to an inlet side of the compressor head assembly, energizing the internal combustion engine and compressing natural gas in a cylinder bore aligned with the compressor head assembly, and discharging compressed gas from the compressor head assembly to a downstream location, such as a wellhead or pipeline. The compressor head assembly comprises one or more compressor valves disposed therein with an inlet flow path thereto and means to hold the valves in place. The method may also comprise manifolding a plurality of inlet flow paths in the compressor head assembly when more than one valve is used.

In preferred embodiments, the method of transferring natural gas further comprises the step of venting natural gas from a crankcase of the engine to a fuel inlet portion of the engine and another step of sensing viscosity of oil in a crankcase of the engine and deenergizing the engine when the viscosity drops below a predetermined level. Cooling of the natural gas after compression thereof may also be provided.

The compressor of the present invention may be said to comprise a cylinder, a piston reciprocably disposed in the cylinder, a head attached to the cylinder, a concentric valve having an operating position in the head, a valve chair attached to the head such that the valve is held in the operating position wherein the valve chair defines an inlet flow path in communication with an inlet portion of the valve and an outlet flow path in communication with an outlet portion of the valve, and an inlet manifold attached to the head and in communication with the inlet flow path wherein the manifold encloses the valve chair. Sealing means may be provided between the inlet manifold and the head, and further sealing means may also be provided between the inlet and outlet flow paths. In the preferred embodiment, the compressor is integral with an internal combustion engine such that a plurality of cylinder bores in a first bank of the cylinder block of the engine contain engine pistons and the cylinder bores in a second bank of the cylinder block contain compressor pistons. Studs and nuts are used to hold the valve chairs to the head and also to hold the inlet manifold to the head.

Sensing of the oil viscosity in the pressure lubricated compressor crankcase is accomplished by connecting a valve to an oil pressure source in the crankcase, discharging the oil from the valve to a reservoir portion of the crankcase, such as the oil pan, and measuring of pressure drop across the valve which corresponds to a viscosity of the oil. The valve may be adjusted such that pressure drop across the valve is at a predetermined initial level when the oil is fresh and the viscosity thereof substantially known. A signal may be generated in response to the pressure drop through a means such as a differential pressure switch gauge, and a prime mover for the compressor, such as an integral engine, is deenergized in response to the signal. Another valve may be connected to the oil pressure source upstream from the first mentioned valve, and this other valve may be adjusted for controlling a flow rate of the oil to the first mentioned valve.

It is an important object of the present invention to provide a natural gas compressor with an integral internal combustion engine. It is another object of the invention to provide a method of transferring natural gas by modifying cylinders in an internal combustion engine into a gas compressor.

A further object of the invention is to provide an integrated gas compressor and internal combustion engine with means for preventing flammable gas buildup in the crankcase thereof.

Still another object of the invention is to provide a method and apparatus for sensing oil viscosity in a gas compressor crankcase and deenergizing a prime mover for the compressor when the oil viscosity drops below a predetermined level.

Additional objects and advantages of the invention will become apparent as the following detailed description of the preferred embodiment is read in conjunction with the drawings which illustrate such preferred embodiment.

BRIEF DESCRIPTION OF THE DRAWINGS

FIG. 3 shows an end view of the integral gas compressor and internal combustion engine of the present invention.

FIG. 4 is a detailed view of the gas compressor portion of the apparatus of the present invention taken along lines 4-4 in FIG. 3.

FIG. 4*a* is an enlargement of a portion of FIG. 4.

DETAILED DESCRIPTION OF THE PREFERRED EMBODIMENT

Figure 1:
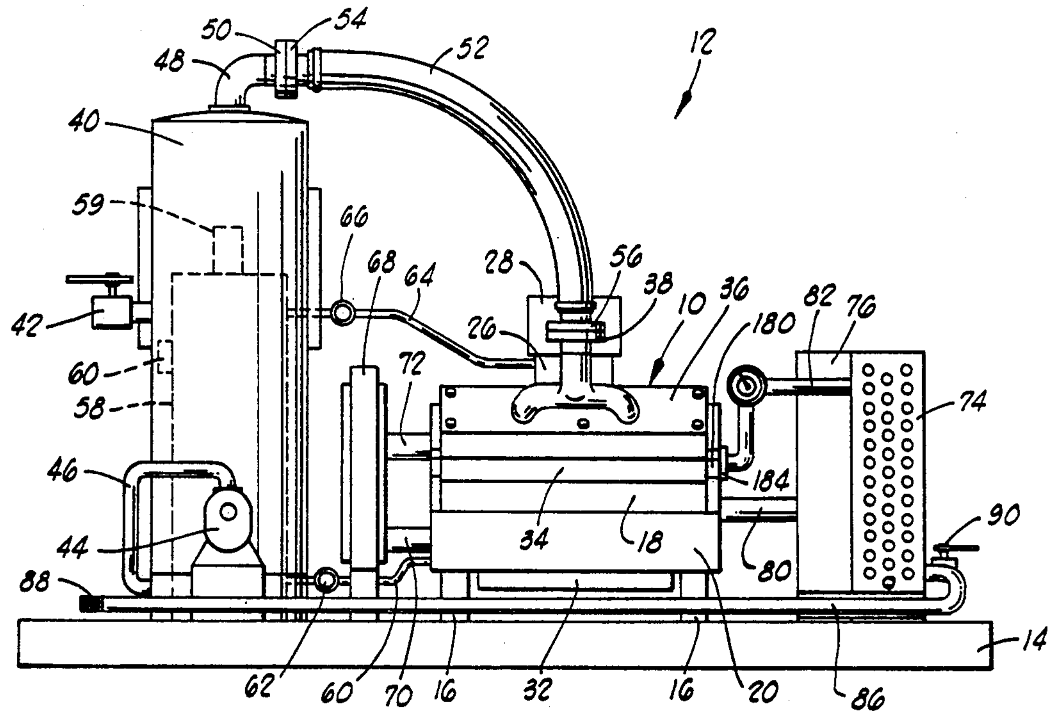
FIG. 1 illustrates a side elevation view of a compressor package using the integral gas compressor and internal combustion engine of the present invention.
Figure 2:
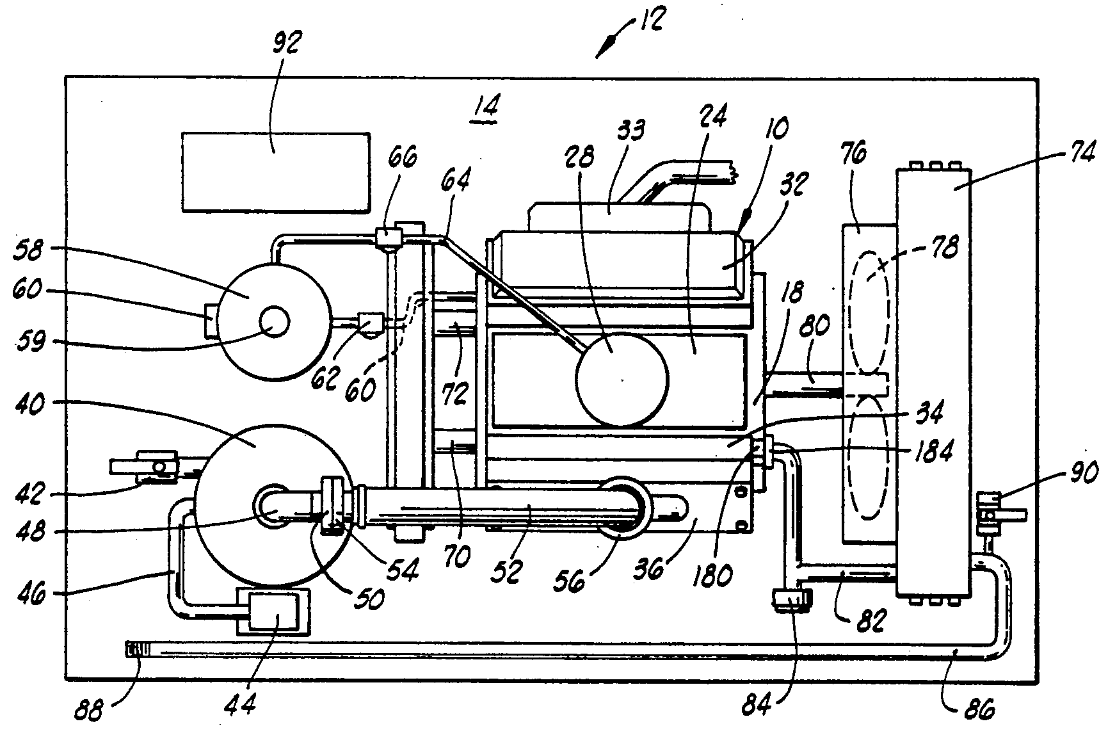
FIG. 2 is a plan view of the package shown in FIG. 1.

Referring now to the drawings, and more particularly to FIGS. 1 and 3, the integral gas compressor and internal combustion engine of the present invention is shown, and generally designated by the numeral 10, as forming a portion of a compressor package 12. Integral gas compressor and internal combustion engine will also be referred to herein as simply compressor 10. Compressor package 12 as illustrated is of a type particularly well adapted for use in recovering natural gas from a well, but may be used for other flammable gases or gases with elevated inlet pressures. The invention is not intended to be limited to the illustrated compressor package 12. FIGS. 1 and 2 have been greatly simplified to eliminate much of the piping and wiring associated with package 12. The omitted items are known in the art and not necessary for an understanding of the invention.

Compressor 10 in package 12 is mounted on a skid or baseplate 14 by a mounting means 16 of a kind known in the art. Compressor 10 is preferably constructed by modifying a known internal combustion engine, such as a 460 cubic inch Ford V-8 engine.

Referring now also to FIG. 3, the V-shaped configuration of compressor 10 may be seen. Compressor 10 includes a cylinder block 18 with a crankcase portion 20 at the lower end thereof. Below crankcase 20 is an oil pan 22. Cylinder block 18, crankcase 20 and oil pan 22 are standard components of the original Ford or other engine. At the upper end of cylinder block 18 is an engine manifold with a carburetor 26 and air cleaner 28 connected thereto. Connected to cylinder block 24 on the left bank of cylinders, as viewed in FIG. 3, is a standard engine head 30 with a valve cover 32 thereon. An exhaust manifold 33 carries away the exhaust gases of the engine. This left side of compressor 10 remains basically a standard engine and includes all of the normal engine components such as valve train, spark plugs, wiring, etc. For simplicity, these engine components are not illustrated.

The right side of compressor 10, as viewed in FIG. 3, is the modified side of the engine used for gas compression. A compressor head 34 is attached to cylinder block 18 on the right bank of cylinders. It will be seen by those skilled in the art, that compressor head 34 replaces engine head 30 on this side. Connected to compressor head 34 is a compressor inlet manifold 36. Attached to inlet manifold 36 is a flange 38. Details of the compressor side of apparatus 10 will be further discussed herein.

Referring again to FIGS. 1 and 2, an inlet tank and liquid separator 40 is attached to skid 14. A valve 42 is in communication with tank 40 and is adapted for connection to the source of the gas to be compressed. In one embodiment, this gas would be natural gas from a wellhead (not shown). Tank 40 is of a kind generally known in the art and includes a means for separating liquids out of the incoming gas. A pump 44 is connected to tank 40 by a line 46 and is used to pump liquids collected in tank 40 to any desired location.

At the top of tank 40 is a connection 48 having a flange 50 connected thereto. A line or hose 52 with flanges 54 and 56 on opposite ends thereof interconnects flange 50 and flange 38 on inlet manifold 36. Thus, line 52 is an inlet or suction line to compressor 10.

Positioned adjacent to tank 40 is a fuel vessel 58 with a pressure relief valve 59 connected thereto. Relief valve 59 may be piped away as desired. Fuel vessel 59 has an inlet 60 adapted for connection to a fuel source, such as the natural gas wellhead. A line 60 with a regulator 62 therein interconnects fuel vessel 58 and crankcase 20 of compressor 10. Another line 64 with a regulator 66 therein interconnects fuel vessel 58 with carburetor 26 on the engine.

A standard engine radiator 68 is positioned adjacent to compressor 10 and connected thereto by radiator hoses 70 and 72 of a kind known in the art for cooling of both the compressor and engine sides. A fan (not shown) of a kind known in the art may be used to draw air across radiator 68.

At the opposite end of skid 14 is an aftercooler 74, of a kind known in the art, which is used to cool gas discharged from compressor 10. Aftercooler 74 is of a finned tube type with a fan shroud 76 connected thereto with a cooling fan 78 rotatably disposed therein. A drive shaft 80 extends from compressor 10 to drive fan 78.

A discharge line 82 connects the outlet of compressor head 34 with aftercooler 74. A combination pressure gauge and shutoff switch 84 is disposed in discharge line 82 to deenergize the engine portion if the compressor discharge pressure exceeds a predetermined level.

An aftercooler outlet line 86 is connected to aftercooler 74 and extends toward the opposite end of skid 14 such that a threaded end 88 of line 86 is positioned generally adjacent to tank 40. A drain valve 90 may be positioned in line 86, preferably adjacent to aftercooler 74, so that moisture and other liquids may be drained from aftercooler 74 as necessary.

An electrical control panel 92 for controlling the apparatus may be positioned on skid 14. Control panel 92 is of a kind generally known in the art, and the connections thereto are omitted for clarity.

Turning again to FIG. 3, standard engine pistons 94 are reciprocably disposed in the cylinders on the left bank of cylinder head 18, and the engine pistons are connected to crankshaft 96 by connecting rods 98. Again, pistons 94, crankshaft 96 and connecting rods 98 are the original components of the modified engine used to construct compressor 10.

In the right bank of cylinder block 18 are a plurality of reciprocably disposed compressor pistons 100. Each compressor piston 100 is connected to crankshaft 96 by additional connecting rods 98. Compressor pistons 100 may be of special configuration, but connecting rods 98 are preferably the same used in the original engine.

Figure 6:
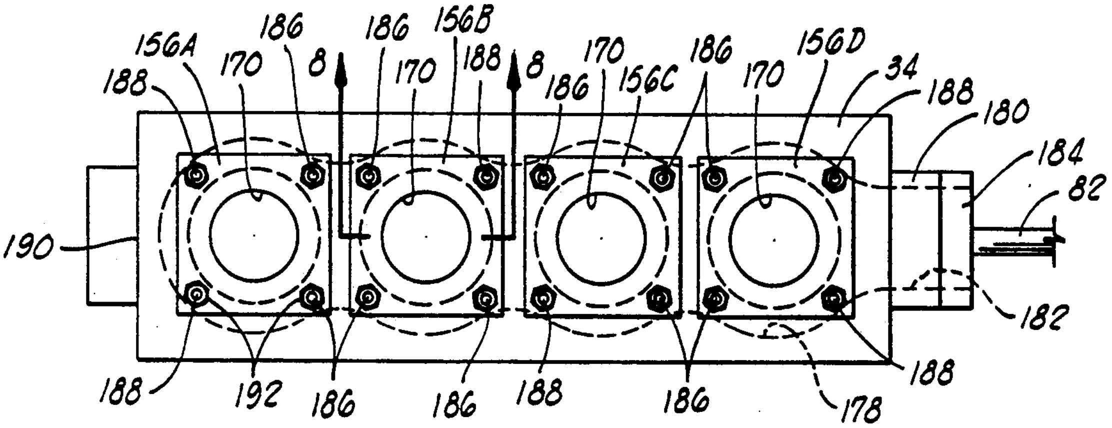
FIG. 6 illustrates a top view of the compressor section with the inlet manifold removed.
Figure 8:
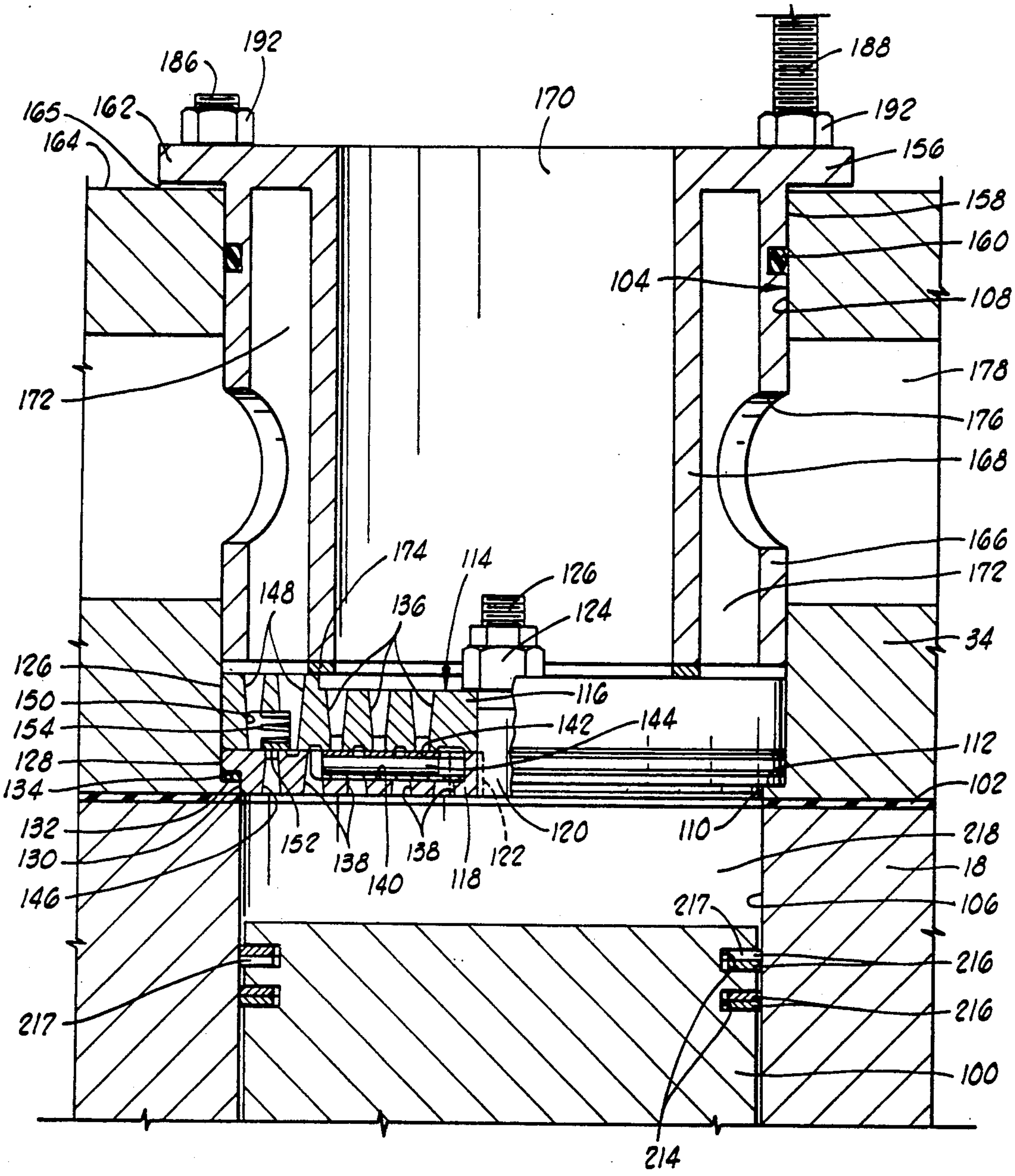
FIG. 8 is a cross section taken along lines 8—8 in FIG. 6.

Referring now to FIGS. 6 and 8, the details of compressor head 34 and the components therein will be discussed. Compressor head 34 is positioned adjacent to cylinder block 18 with a sealing means, such as gasket 102, disposed therebetween. Compressor head 34 defines a plurality of valve pockets 104 therein with one valve pocket for each cylinder bore 106 in cylinder head 18. Each valve pocket 104 is substantially coaxial with the corresponding cylinder bore 106 and includes a first bore 108 and a relatively smaller second bore 110 therein. An annular shoulder 112 extends between first bore 108 and second bore 110.

A concentric compressor valve 114, of a kind generally known in the art, is disposed in each of valve pockets 104. Each valve 114 comprises an upper body 116 and a lower body 118. A center post 120 is engaged with lower body 118 and extends upwardly therefrom and through upper body 116. A set screw or dowel pin 122 prevents separation of center post 120 and lower body 118 and further prevents relative rotation therebetween. A lock nut 124 is threadingly engaged with an upper end 126 of center post 120 to clamp upper body 116 against lower body 118.

Upper body 116 has an outside diameter 126 adapted for close, spaced relationship with first bore 108 in valve pocket 104. Lower body 128 has a first outside diameter 128 which is substantially the same size as outside diameter 126. Lower body 118 further has a second, smaller outside diameter which is in close, spaced relationship with second bore 110 in valve pocket 104. An annular shoulder 132 extends between first outside diameter 128 and second outside diameter 130 on lower body 118. A sealing means, such as valve gasket 134, provides sealing engagement between lower body 118 and valve pocket 104 in compressor head 34.

Upper body 116 defines a plurality of inlet ports 136 therein, and lower body 118 defines a plurality of outlet ports 138 therein in communication with a recess 140. A suction or inlet valve plate 142 is disposed in recess 140 and covers inlet ports 136 when in a closed position. A leaf spring 144 or other type of spring is also disposed in recess 140 and biases suction valve plate 142 toward its closed position.

Radially outwardly of outlet ports 138, lower body 118 defines an inlet port 146. Radially outwardly of inlet ports 136, upper body 116 defines outlet ports 148 therein which are in communication with a recess 150. A discharge or outlet valve plate 152 is disposed in recess 150 and covers inlet port 146 when in a closed position. At least one spring 154 is disposed in recess 150 to bias discharge valve plate 152 toward its closed position.

A valve chair 156 has an outside diameter 158 which extends into first bore 108 of valve pocket 104. A sealing means, such as O-ring 160, provides sealing engagement between valve chair 156 and compressor head 34. Valve chair 156 also includes an upper flange portion 162 adjacent to top surface 164 of compressor head 34. Flanged portion 162 is spaced from top surface 164 such that a gap 165 is defined therebetween.

Outside diameter 158 is the outer surface of a substantially cylindrical outer wall 166. A substantially cylindrical inner wall 168 is disposed radially inwardly from outer wall 166. Inner wall 168 defines a suction or inlet flow passage 170 in communication with inlet ports 136 in upper body 116 of valve 114. Outer wall 166 and inner wall 168 define an annular discharge or outlet flow path 172 therebetween which is in communication with outlet ports 148 in upper body 116 of valve 114. A sealing means, such as gasket 174, is provided between the lower end of inner wall 168 and the upper end of upper body 116 for sealing engagement between valve chair 156 and valve 114. It will be seen that gasket 174 also sealingly separates inlet flow path 170 and discharge flow path 172.

Outer wall 166 of valve chair 156 defines a plurality of openings 176 therein. Openings 176 are in communication with a discharge passageway 178 defined in compressor head 34. As seen in FIG. 6, discharge passage 178 interconnects all of valve pockets 104 in compressor head 34, thus forming an internal discharge manifold within the compressor head.

Still referring to FIG. 6, compressor head 34 has a discharge flange 180 at one longitudinal end thereof, and the discharge flange defines a discharge opening 182 therethrough. Discharge opening 182 is a longitudinally outer end portion of discharge passageway 178. Discharge flange 180 is adapted for connection to a corresponding flange 184 at one end of discharge line 82. This connection is also shown in FIGS. 1, 2, 4 and 5.

In FIG. 6, four valve chairs 156 are illustrated and identified as 156A, 156B, 156C and 156D. A plurality of short studs 186 and long studs 188 extend from compressor head 34 through corresponding holes in flange portions 162 of valve chairs 156. In the preferred embodiment, two long studs 188 extend through valve chair 156A adjacent to longitudinal end 190 of compressor head 34. Two short studs 186 extend through the other holes in valve chair 156A. One long stud 188 extends through the upper right corner, as viewed in FIG. 6, of valve chair 156B, and short studs 186 extend through the other holes in valve chair 156B. In a similar fashion, a long stud 188 extends through the lower left corner of valve chair 156C, and three short studs 186 extend through the other holes in valve chair 156C. The stud arrangement for valve chair 156D is essentially a mirror image of that for valve chair 156A. That is, two long studs 188 extend through valve chair 156D adjacent to discharge flange 180, and two short studs 186 extend through the other holes in valve chair 156D.

Short studs 186 are of sufficient length that a nut 192 may be engaged therewith to clamp the corresponding valve chair 156 against compressor head 34, as best seen in FIG. 8. Nuts 192 are similarly engaged with each long stud 188. It will be seen that gap 165 insures that valve chair 156 bears against gasket 174 and valve 114 bears against gasket 134 when the valve chair is clamped in place by nuts 192.

Figure 5:
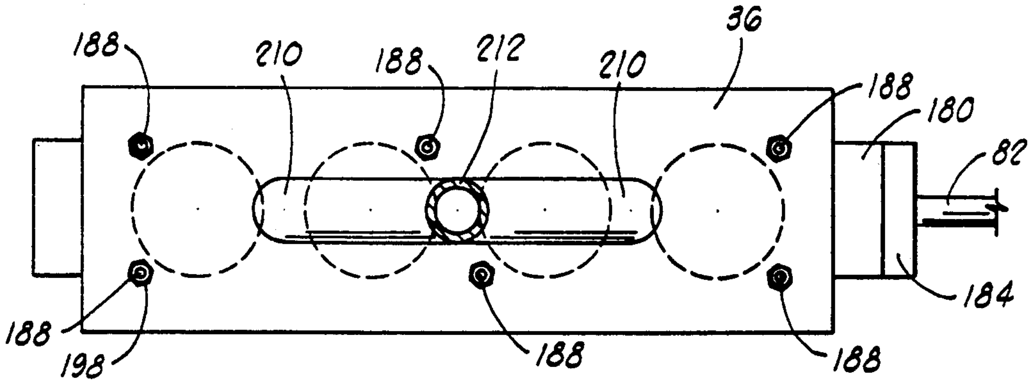
FIG. 5 is a view of the compressor section taken along lines 5—5 in FIG. 4.
Figure 7:
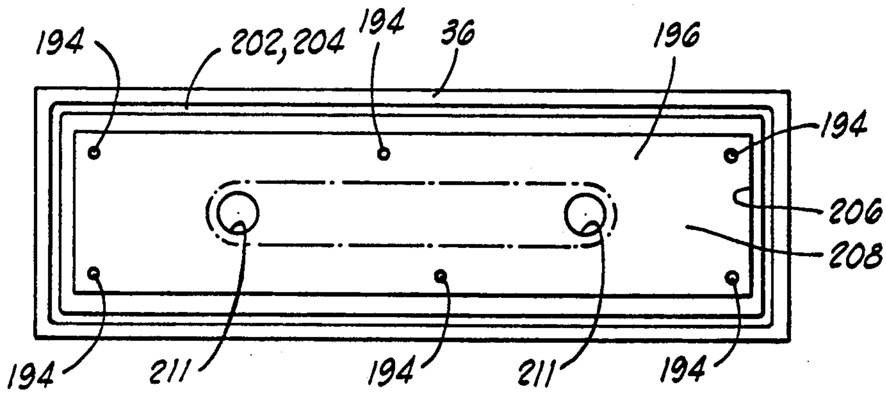
FIG. 7 shows a bottom view of the inlet manifold.

Referring now to the bottom view of inlet manifold 36 shown in FIG. 7, a plurality of holes 194 are defined through top portion 196 thereof. Holes 194 are located to correspond with long studs 188 extending from compressor head 34. Long studs 188 are of sufficient length so that they will extend upwardly through holes 194 in inlet manifold 36 when the inlet manifold is installed as shown in FIGS. 4 and 5. A nut 198 is engaged with each stud 188 to fasten inlet manifold 36 in place. A sealing means, such as gasket 200, provides sealing engagement between top portion 196 of inlet manifold 36 and the corresponding nut 198 and stud 188.

Referring to FIGS. 4, FIG. 4a and 7, a substantially rectangular groove 202 is defined in the bottom of inlet manifold 36. A sealing means, such as 0-ring 204, is disposed in groove 202 to provide sealing engagement between inlet manifold 36 and top surface 164 of compressor head 34. Inlet manifold 36 defines a substantially rectangular inner wall 206 which fits around all of valve chairs 156 when the inlet manifold is installed. Thus, it will be seen by those skilled in the art that 0-ring 204 seals against top surface 164 of compressor head 34 at a position thereon outwardly of all of valve chairs 156. It will be seen that an inner cavity 208 defined by wall 206 in inlet manifold 36 is thus in communication with each of inlet flow paths 170 in valve chairs 156.

At the upper end of inlet manifold 36 are a pair of opposed elbow portions 210 which are joined at a neck portion 212. Elbow portions 210 have holes 211 therein in communication with inner cavity 208 in inlet manifold 36. Neck portion 212 is attached to flange 38, previously described. Thus, a flow path is formed between flange 38 and cavity 208 in inlet manifold 36, and thus a path is formed to direct gas into inlet flow paths 170 in compressor 10.

Referring again to FIG. 8, compressor piston 100 defines a plurality of piston grooves 214 therein. Disposed in each groove 214 are a pair of piston rings 216. Each pair of piston rings 216 in a single groove 214 are positioned such that any circumferential gaps 217 in the piston rings are substantially diametrically opposed from one another so that gas leakage by the piston rings into the compressor crankcase are minimized.

Figure 9:
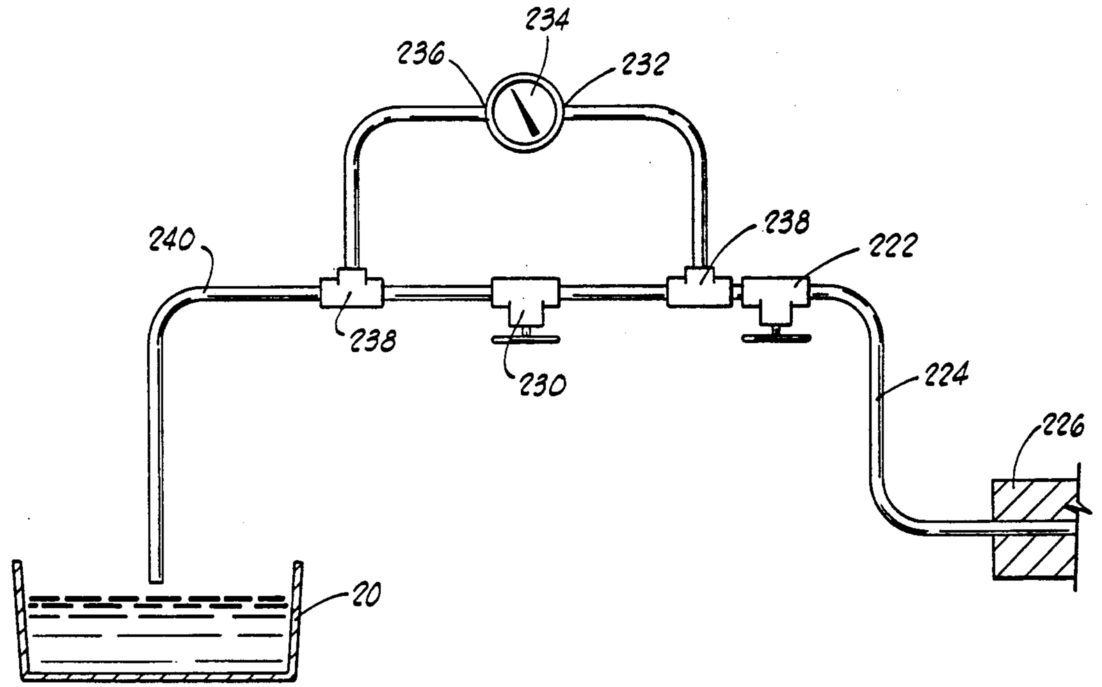
FIG. 9 presents a schematic showing the oil viscosity sensing apparatus of the present invention.

Referring now to FIG. 9, an oil viscosity sensing system of the present invention is shown and generally designated by the numeral 220. A first needle valve 222 is placed in communication with an oil passage 224 from an oil pressure source such as engine bearing header 226 which is a part of crankcase 20 or cylinder block 18. A downstream side of first needle valve 222 is connected to a first tee 238 which in turn is connected to a second needle valve 230 and a first side 232 of a differential pressure switch-gauge 234. A second side 236 of switch gauge 234 and the downstream side of second needle valve 230 are connected to a second tee 238. Second tee 238 is also connected back to crankcase 20 through an oil passage 240.

OPERATION OF THE INVENTION

After the engine has been converted to form compressor 10 and the apparatus installed in package 12, it is ready for operation such as the compression of natural gas from a wellhead. A line from the wellhead is connected to inlet valve 42 on tank 40, and the appropriate connection is also made to inlet line 60 on fuel vessel 58. Similarly, threaded end 88 of discharge line 86 is connected to whatever is downstream, such as a storage vessel or pipeline.

If the gas being handled is suitable as fuel for the engine portion of compressor 10, this fuel flows from fuel vessel 58 through fuel line 64 into carburetor 26. Pressure regulator 66 insures that the fuel pressure at carburetor 26 is maintained at a constant, predetermined level as required by the carburetor. The engine portion of compressor 10, which is the left side as seen in FIG. 3, operates in a normal manner to rotate crankshaft 96 and thus operate the compressor side, which is the right side of FIG. 3. In this way, compressor pistons 100 are reciprocated within cylinder bore 106.

As previously described, the gas enters inlet manifold 36 of compressor 10 through hose 52. The gas is then in communication with each of inlet flow paths 170, and thus in communication with each of compressor valves 114.

Referring to FIG. 8, as piston 100 moves downwardly from its top dead center position, a variably sized volume 218 is formed in cylinder bore 106. When the pressure in volume 218 drops below that of the incoming gas in inlet flow path 170, a pressure differential is formed across suction valve plate 142. When the force exerted by this pressure differential exceeds that exerted by spring 144, suction valve plate 142 will be moved downwardly to its open position, and the gas and inlet flow path 170 will flow through inlet ports 136 in upper body 116 and outlet ports 138 in lower body 118 into volume 218. When the gas pressure in inlet flow path 170 and in volume 218 are substantially equalized, it will be seen that spring 144 will return suction valve plate 142 to its closed position.

As piston 100 reaches its bottom dead center position, and starts to move upwardly again within cylinder bore 106, the gas' in volume 218 is obviously compressed. Eventually, the gas pressure in volume 218 exceeds the downstream gas pressure in discharge flow path 172 such that a pressure differential is formed across discharge valve plate 152. When the force exerted by this pressure differential exceeds that exerted by spring 154, discharge valve plate 152 is moved upwardly to its open position so that the compressed gas is forced out of volume 218 through inlet port 146 in lower body 118 and outlet ports 148 in upper body 116, and thus into discharge flow path 172 and discharge passage 178 in compressor head 34. When the pressures in volume 218 and discharge flow path 172 are substantially equalized, spring 154 will return discharge valve plate 152 to its closed position, so the cycle may start again.

The gas transferred by compressor 10 is discharged through discharge opening 182 into discharge line 82. The compressed gas is at an elevated temperature and flows into aftercooler 74 for cooling and eventual discharge to the downstream location through discharge line 86.

Even though piston rings 216 are designed to minimize leakage thereby, there will always be some gas leakage, and the result is a gas buildup in crankcase 20 of compressor 10. Crankcase 20 is, of course, the original automotive component and is not designed for significant pressurization, so a means is provided to vent the crankcase. In the case of flammable or other hazardous gases, obviously this venting cannot be to the atmosphere. In the embodiment shown, the gas is vented through line 60 back to inlet vessel 58. Regulator 62 regulates the pressure and is adapted to open when the crankcase reaches a predetermined level and thereby allow gas to enter inlet vessel 58 at a constant, predetermined level. Should too much gas accumulate in fuel vessel 58, the excess is exhausted through relief valve 59. Relief valve 59 may be piped away to another location. Thus, a means is provided for venting crankcase 20 to prevent the accumulation of gas therein.

Even with the venting of crankcase 20, the low pressure gas that is present will eventually result in some contamination of the engine oil. For example, the use of natural gas or other hydrocarbons, will eventually dilute the oil until its viscosity is so low that it will no longer properly lubricate the engine bearings. The present invention includes oil viscosity sensing means 220 to prevent damage to the compressor when the oil viscosity falls below a predetermined level.

Referring to FIG. 9, when the engine portion of compressor 10 is running, engine bearing oil pressure is supplied to first needle valve 222. Needle valve 222 is adjusted so that only a predetermined volume of oil flows therethrough. It will be seen that differential pressure switch gauge 234 is adapted for actuating in response to the differential pressure across second needle valve 230. By adjusting second needle valve 230, a set point or initial level for the differential pressure is obtained. This adjustment is preferably made when the oil in crankcase 20 of compressor 10 is new and has a substantially known viscosity. As the oil in crankcase 20 is gradually diluted, the viscosity thereof is reduced. This reduction is viscosity results in a reduction in differential pressure across second needle valve 230 as oil flows therethrough in viscosity sensing system 220. Differential pressure switch gauge 234 is set to actuate when this differential pressure across second needle valve 230 drops below a predetermined level which corresponds to the minimum oil viscosity level. Differential pressure switch gauge 234 is connected to the controls of the engine portion of compressor 10 and will deenergize the engine when actuated. Thus, the engine portion of compressor 10 is shut down when the oil viscosity falls below a predetermined level so that damage to the bearings and other drive components in crankcase 20 is avoided.

It will be seen, therefore, that the integral gas compressor and internal combustion engine of the present invention is well adapted to carry out the ends and advantages mentioned as well as those inherent therein. While a presently preferred embodiment of the apparatus has been described for the purposes of this disclosure, numerous changes in the arrangement and construction of parts may be made by those skilled in the art. All such changes are encompassed within the scope and spirit of the appended claims.

What is claimed is:

1. A method of sensing oil viscosity in a pressure lubricated compressor crankcase, said method comprising the steps of:

connecting a valve between an oil pressure source in said crankcase nd a low pressure portion of said crankcase;

flowing oil from said oil pressure source through said valve and discharging oil from said valve to said low pressure portion of said crankcase;

adjusting said valve such that a pressure drop across said valve is set at an initial level; and measuring said pressure drop across said valve over time and thereby monitoring changes in the viscosity of said oil.

2. The method of claim 1 further comprising the steps of:

generating a signal in response to changes in said pressure drop corresponding to said changes in said viscosity of said oil; and deenergizing a prime mover for said compressor in response to said signal.

3. The method of claim 1 further comprising connecting another valve between said oil pressure source and the first mentioned valve.

4. The method of claim 3 further comprising the step of adjusting the other valve for variably controlling a flow rate of oil to said first mentioned valve.

* * * * *